(12) United States Patent
Jeong et al.

(10) Patent No.: US 6,757,471 B2
(45) Date of Patent: Jun. 29, 2004

(54) OPTICAL FIBER BLOCK ASSEMBLY FOR MINIMIZING STRESS CONCENTRATION AND CONTACTING DEVICE THEREWITH

(75) Inventors: Byung-Gil Jeong, Taekwangyok-shi (KR); Hyun-Chae Song, Suwon-shi (KR); Seung-Wan Lee, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/274,578

(22) Filed: Oct. 21, 2002

(65) Prior Publication Data

US 2003/0081926 A1 May 1, 2003

(30) Foreign Application Priority Data

Nov. 1, 2001 (KR) ........................................ 2001-67761
Dec. 27, 2001 (KR) ........................................ 2001-85796

(51) Int. Cl.[7] ................................................. G02B 6/00
(52) U.S. Cl. .......................................... 385/137; 385/49
(58) Field of Search ........................................ 385/137

(56) References Cited

U.S. PATENT DOCUMENTS

| | | | |
|---|---|---|---|
| 4,657,341 A | 4/1987 | Sammueller | 350/96.22 |
| 6,103,344 A | 8/2000 | Ota et al. | 428/172 |
| 6,295,404 B1 * | 9/2001 | Ichigi et al. | 385/137 |

FOREIGN PATENT DOCUMENTS

| | | | | |
|---|---|---|---|---|
| EP | 0608566 A2 | | 8/1994 | ............ G02B/6/30 |
| EP | 1003057 A2 | | 5/2000 | ............ G02B/6/38 |
| WO | WO 90/04194 | * | 4/1990 | |
| WO | WO 99/28775 | | 6/1999 | ............ G02B/6/38 |

OTHER PUBLICATIONS

Patent Abstract of Japan, JP 08262272; Oct. 11, 1996; Kikuchi Yoshio.
Patent Abstract of Japan, JP 06 222246; Aug. 12, 1994; Hamashima Akira.

* cited by examiner

Primary Examiner—Douglas Wille
(74) Attorney, Agent, or Firm—Cha & Reiter, L.L.C.

(57) ABSTRACT

The present invention discloses an optical-fiber-block assembly for minimizing stress concentration. The optical-fiber-block assembly is comprised of a fiber-alignment area mounted with a plurality of V-grooves at which optical fibers are disposed and a stress-relief-depth area extending from the fiber-alignment area and formed by etching the fiber-alignment area deeper by a predetermined amount, for relieving stress that is caused by the coating thickness of the fiber, wherein the fiber-alignment area further includes: (a) a first fiber-alignment area having a first V-grooves with a constant width for receiving the bare fibers, such that the first fiber-alignment area do not contact the external side of the bare fiber, and (b) a second fiber-alignment area having a second V-grooves with a constant width extending from the first V-grooves for receiving the bare fiber, wherein the width of the first V-grooves is substantially wider than the width of the second V-grooves.

20 Claims, 12 Drawing Sheets

OPTICAL FIBER BLOCK ASSEMBLY FOR MINIMIZING STRESS CONCENTRATION AND CONTACTING DEVICE THEREWITH

CLAIM OF PRIORITY

This application makes reference to and claims all benefits accruing under 35 U.S.C. Section 119 from applications entitled, "Optical Fiber Block Assembly for Minimizing Stress Concentration and Contacting Device Therewith," filed in the Korean Industrial Property Office on Nov. 1, 2001 and Dec. 27, 2001 and there duly assigned Ser. No. 2001-67761 and Ser. No. 2001-85796, respectively.

BACKGROUND OF THE INVENTION

1. Field of the Invention

The present invention relates to an optical-fiber-block assembly for connecting a planar-light circuit (PLC) to an optical fiber. In particular, the present invention relates to an optical-fiber-block assembly that includes an optical-fiber block and a glass cover for minimizing stress imposed on the optical fiber, and its related contacting device.

2. Description of the Related Art

In WDM (Wavelength Division Multiplexing) communication systems, optical signals with multiple N wavelengths are transmitted simultaneously through a single strand of optical fiber to accommodate a large volume of data traffic. To this end, a PLC (Planar Lightwave Circuit) is widely used for the optical-signal processing, such as the optical signal's bifurcation, modulation, switching, multiplexing, and so forth. To connect the PLC to an optical fiber, an optical-fiber block is typically employed. The optical-fiber block is also one of the optical components that are used as an input/output port of a Micro-Optic device.

FIG. 1 illustrates a connection state of a conventional Planar-Lightwave Circuit 10 (PLC) with an optical-fiber block 20 and 30. As shown in the drawing, each of the optical blocks 20 and 30 is connected to the PLC 10 at its input/output side and also connected to each single fiber F1 and a ribbon fiber F2. In operation, N wavelengths (N is a natural number) are inputted in the input port of the PLC 10 via the single fiber F1, then the inputted optical signals are multiplexed while passing through the PLC 10. Each multiplexed optical signal is then outputted through the ribbon fiber F2, respectively. An adhesive B, such as epoxy resin, is used to fix the alignment of the input/output side of the optical fiber block 20 and 30, each being connected to the input/output port of the PLC 10. In addition, glass covers C1 through C4 are adhered to the input/out side of the PLC 10 as well as the input/output side of the optical fiber block 20 and 30, respectively. The glass covers C1 and C2 are adhered to the input/output side of the PLC 10 for processing, and the glass covers C3 and C4 are adhered to the input/output side of the optical fiber block 20 and 30 to support each aligned optical fiber. In the drawing, the reference mark S indicates a silicon substrate on which the optical circuit is provided to process optical signals.

With reference to FIGS. 2 through 4, the components of an output side optical-fiber block 30 in accordance with the related art will be explained hereinafter. As depicted in the drawings, the conventional optical-fiber block 30 is divided into a fiber-alignment area 301 in which the bare fibers BF whose coatings are peel-off are aligned, and a stress-relief-depth area 302 for relieving the stress that is generated due to the coating thickness of the ribbon fiber. For the fiber-alignment area 301, a plurality of V-grooves 310 is provided to receive the bare fibers BF. Note that the fiber-alignment area 301 and the stress-relief-depth area 302 are created in a very precise manner through a wet-etching process.

A vital function of the fiber block 30 is to support the bare fiber BF disposed in the V-groove 310, to fixate or secure the alignment of each bare fiber BF, and to have the bare fibers BF positioned at a regular interval from each other. Accordingly, it is absolutely important to manufacture a precise V-groove 310 and a glass cover C4 that is in contact with the fiber block 30. Referring to FIG. 4, the cover C4 is attached to the fiber-alignment area 301 for supporting the upper portion of the bare fibers BF aligned thereon. Then, the fiber block 30 and the cover C4 undergo a polishing process to be etched in the form of dicing them to a designated degree ($\theta$), thereby finalizing the alignment state of the fiber.

However, when the fiber block and the fiber are assembled in the manner shown in FIG. 2, that is, if the bare fibers BF are aligned in each V-groove 310, and the glass cover C4 is used to fixate the alignment state after injecting epoxy resin B, the following problems inevitably occur.

First, as shown in FIG. 3, the V-groove 310, the bare fiber BF, and the glass fiber C4 form a contact point at three different locations, P1, P2, and P3, respectively. Although these three contact points P1, P1, and P3, are necessary to maintain the precise alignment state of the bare fibers BF, they experience a considerable amount of stress due to the contraction and expansion of the adhesive B, which was injected to the contact points during the fabrication process. In the drawing, the stress intensity is indicated by the length variation of the arrow, and the direction of the arrow indicates the direction of the stress distribution. As evident in the stress distribution according to the arrow's direction, the stress is concentrated at the three contact points, and particularly, the stress is highest at the contact point P3, where the bare fiber comes in contact with the glass cover C4. In the long run, such stress eventually fatigues the adhesion at the contact point P3, thus causes delamination, a phenomenon where the boundary sides forming the contact point fall apart or become delaminated. This process eventually deteriorates the reliability of the optical components in general.

SUMMARY OF THE INVENTION

Therefore, it is an object of the present invention to provide an optical-fiber-block assembly that includes an optical-fiber block with minimum stress concentration and a cover.

It is another object of the present invention to provide a contacting device therewith.

According to one aspect of the invention, there is provided an optical-fiber-block assembly, which includes an optical-fiber block for connecting a lightwave element to a fiber, and a cover that is in contact with the optical-fiber block for supporting the fiber disposed along at least one V-groove of the optical-fiber block, wherein the cover, for the purpose of minimizing stress concentration, includes: (a) a planar portion having a top surface and a bottom surface; (b) at least one ridge in a designated position of the bottom surface for supporting the fiber disposed in the V-grooves, and (c) a slot adjoined to the ridge gap receiving an adhesive material.

Another aspect of the present invention provides a contacting device using the cover described above which connects a planar-lightwave circuit to an optical fiber. The device includes: (a) an optical block on which at least one optical fiber is aligned along a V-groove; and (b) a cover in a spatial contact relationship with the optical-fiber block using an adhesive material.

Yet another aspect of the present invention provides an optical-fiber-block assembly for minimizing stress concentration using an optical-fiber block having a fiber-alignment area mounted with a plurality of V-grooves at which optical fibers are disposed and a stress-relief-depth area, which is an extended part formed by etching the fiber-alignment area, for relieving stress that is caused by the coating thickness of the fiber. The optical-fiber block further comprises: (a) a first fiber-alignment area having a width within a range that does not contact an external side of the aligned bare fiber, in which the first V-grooves with a constant width are uniformly aligned and extended therefrom; and (b) a second fiber-alignment area having a second V-grooves extending from the first V-grooves and in contact with the external side of the aligned bare fiber, wherein the width of the first V-grooves is substantially wider than the width of the second V-grooves.

The foregoing and other features and advantages of the invention will be apparent from the following, more detailed description of preferred embodiments as illustrated in the accompanying drawings in which reference characters refer to the same parts throughout the various views. The drawings are not necessarily to scale, the emphasis instead is placed upon illustrating the principles of the invention.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For purposes of simplicity and clarity, detailed descriptions of well-known devices, circuits, and methods are omitted so as not to obscure the description of the present invention with unnecessary detail. It should be noted that an optical-fiber-block assembly mentioned in this disclosure indicates an optical-fiber block with a cover.

Figure 5:
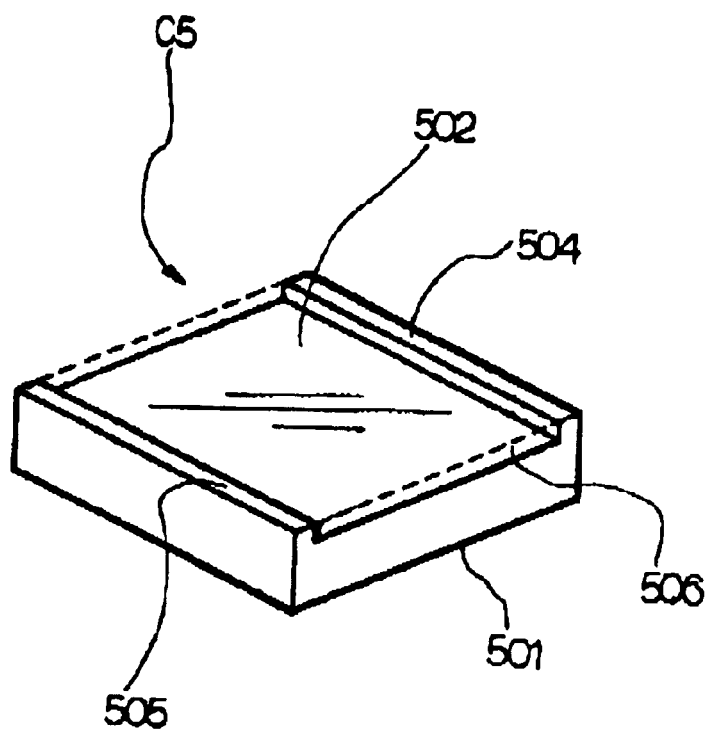
FIG. 5 is a prospective view of the magnified cover of an optical-fiber block assembly according to the first preferred embodiment of the present invention.

Now, the structure of the cover, which is a part of the optical-fiber block assembly, according to the first preferred embodiment of the present invention is explained hereinafter with reference to FIG. 5. As shown in FIG. 5, the cover C5 is planar and may be made of glass, quartz, or silicon material. The cover C5 includes a top surface 501 and a bottom surface 502. A pair of ridges 504 and 505 is provided to both ends of the bottom surface 502, respectively. Each ridge 504 and 505 extends linearly, thereby forming a slot 506 therebetween. The slot comes in contact with the bottom surface 502, such that at least one ridge 504 or 505 can be part of the cover C5. The ridge 504 and 505 is in contact with a bare fiber that is disposed in the V-groove of the fiber-alignment area. When the cover C5 comes in contact with the optical-fiber block, the ridges 504 and 505 are placed in a perpendicular direction to the alignment of the bare fiber.

Figure 6:
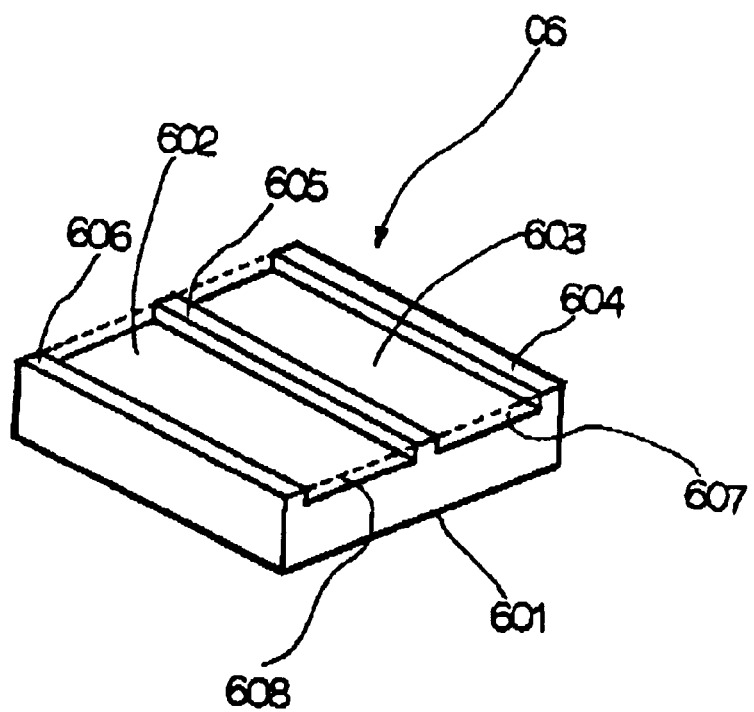
FIG. 6 is a prospective view of the magnified cover of an optical-fiber block assembly according to the second preferred embodiment of the present invention.

Referring to FIG. 6, the cover structure of the optical-fiber-block assembly according to the second embodiment of the present invention is explained hereinafter. As depicted in the drawing, the cover C6 is planar and may be made of glass, quartz, or silicon material. The cover C6 includes the top surface 601 and the bottom surface 602. The ridges 604 through 606 are provided to both ends and the center of both ends of the bottom surface 602, thereby forming two slots 607 and 608 between the ridges. Each of the slot 607 and 608 not only comes in contact with the bottom surface 602 but also adjoins the ridges 604, 605, and 606. Here, more than one ridge can be provided to the cover C6. In this case, three ridges 604, 605, and 606 are provided. Note that the ridges are spaced apart at regular intervals.

Figure 7:
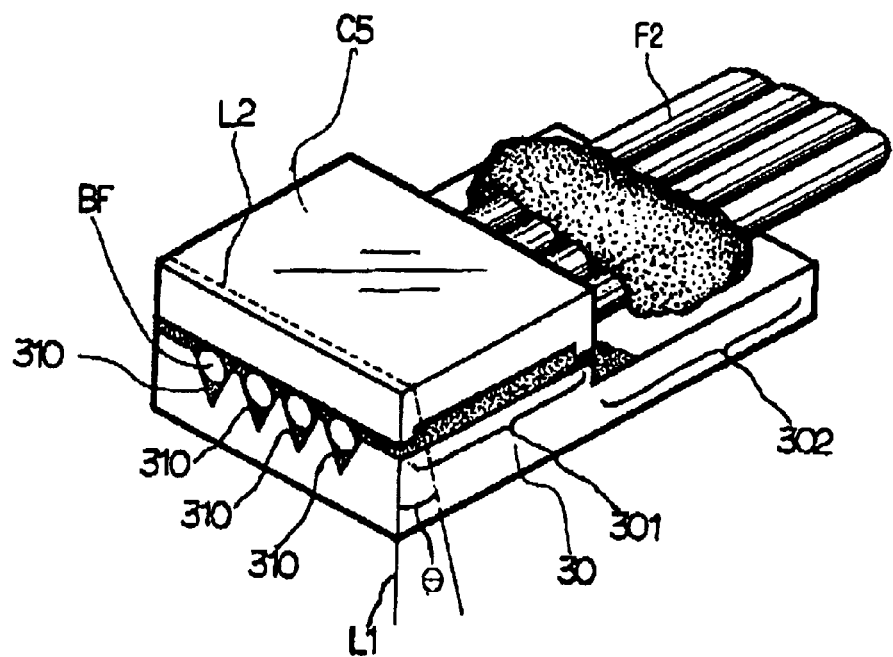
FIG. 7 is a prospective view of an optical fiber supported by a cover prior to an etching process according to the first preferred embodiment of the present invention.
Figure 8:
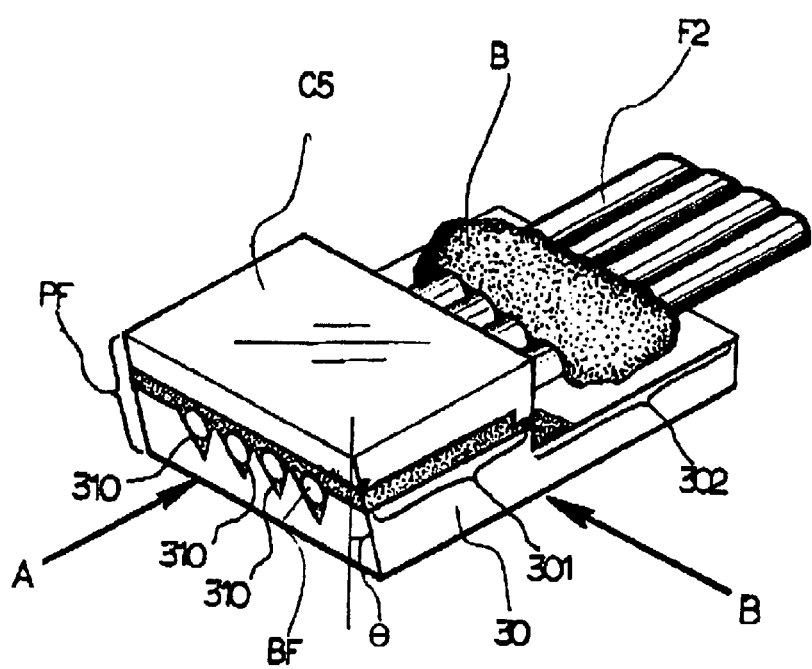
FIG. 8 is a prospective view of an optical fiber supported by a cover after an etching process according to the first preferred embodiment of the present invention.
Figure 9:
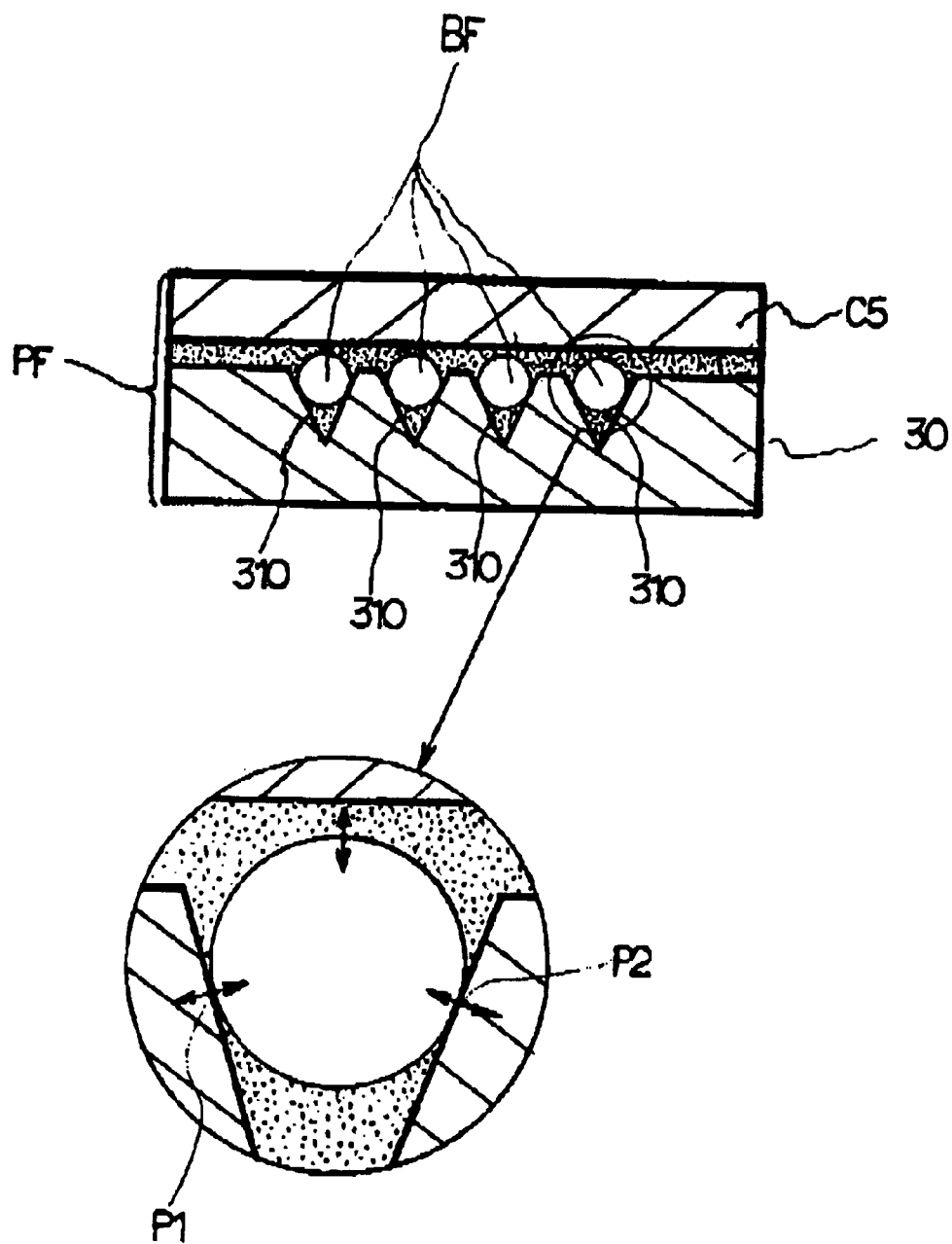
FIG. 9 is a front view showing a cross section of the optical fiber taken along the direction A in FIG. 8.
Figure 10:
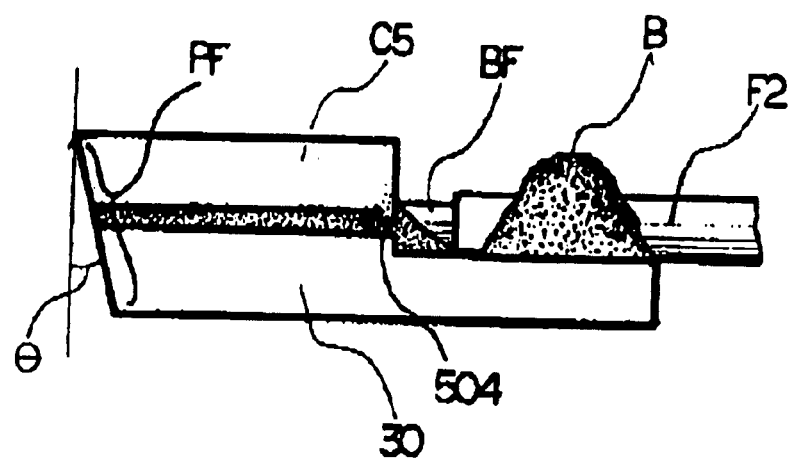
FIG. 10 is a side view of the optical fiber taken along the direction B in FIG. 8.

With reference to FIGS. 7 through 10, a contacting structure of the optical-fiber block 30 using the cover C5 depicted in FIG. 5 will be explained now. As shown in FIG. 7, the optical-fiber block 30 is vital to connect the Planar-Lightwave Circuit (PLC) and the fiber, and the cover C5 is necessary to support the fiber that is placed on the V-groove 310 of the optical-fiber block 30. The optical-fiber block 30 is divided into a fiber-alignment area 301 having a plurality of V-grooves 310 on which the bare-fiber BF is aligned, and a stress-relief-depth area 302 that is formed by etching the fiber-alignment area 301 more deeply. The bare-fiber BF or the uncoated ribbon fiber is disposed in the fiber-alignment area 301, while the ribbon-fiber F2 is disposed at the stress-relief-depth area 302. Thusly contacted fiber then undergoes the dicing and the etching processes to finalize the fiber-alignment state. In FIG. 7, L1 indicates a standard vertical line; L2 indicates a line that is to be diced and etched; and, the angle θ indicates an etching angle. The complete fiber-alignment state after the dicing and the etching processes is shown in FIGS. 8 through 10.

As illustrated in the drawings, the ridge of the cover C5 forms a contact point with the bare-fiber BF. Then, the diced and etched cover C5 to a designated angle is eliminated later as the ridge on the front end is etched, shown in FIGS. 8 and 10. Here, the cover C5 is fixated at a distant position from the bare-fiber BF, which is placed on the V-groom 310. Thus, there exists a split between the bare-fiber BF and the bottom surface of the cover C5, to which the adhesive, epoxy-resin B, is filled in and hardened.

Figure 1:
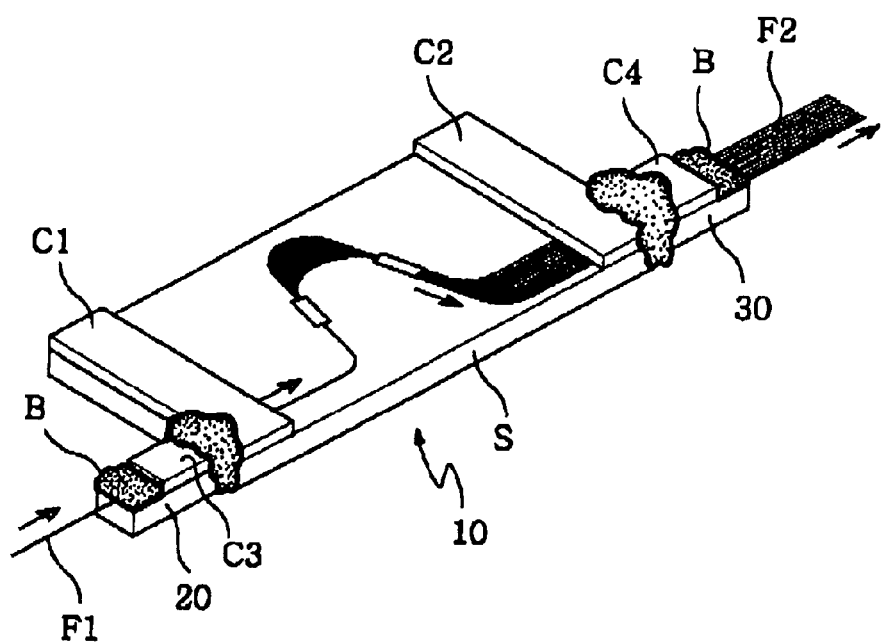
FIG. 1 is a prospective view of an input-fiber block and an output-fiber block connected to a Planar-Lightwave Circuit (PLC) according to the related art.
Figure 2:
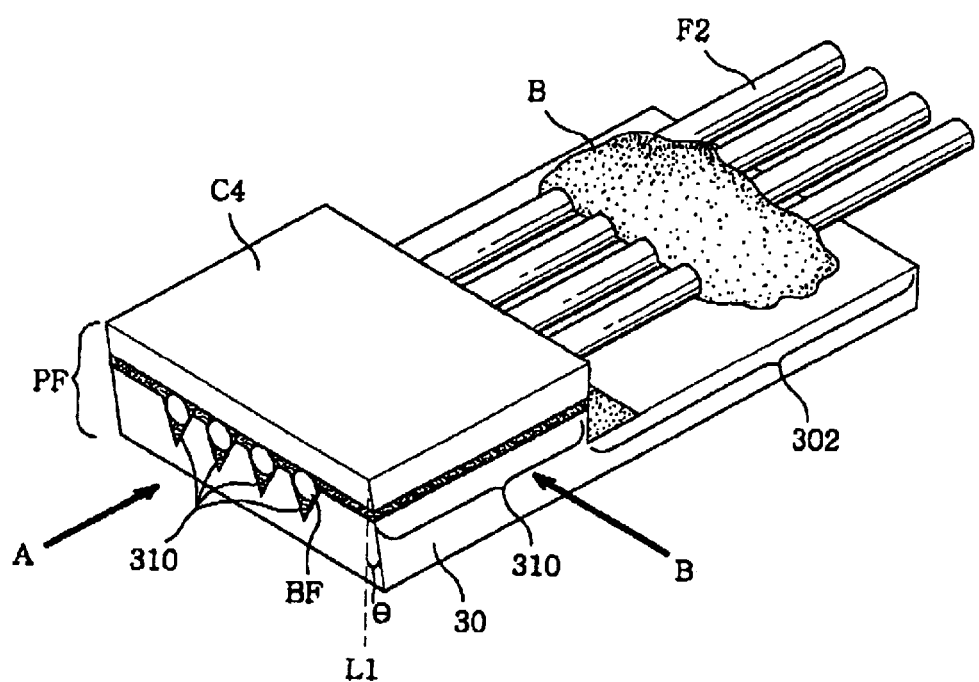
FIG. 2 is a prospective view of the contact state of an optical fiber supported by an optical-fiber block and a cover according to the related art.
Figure 3:
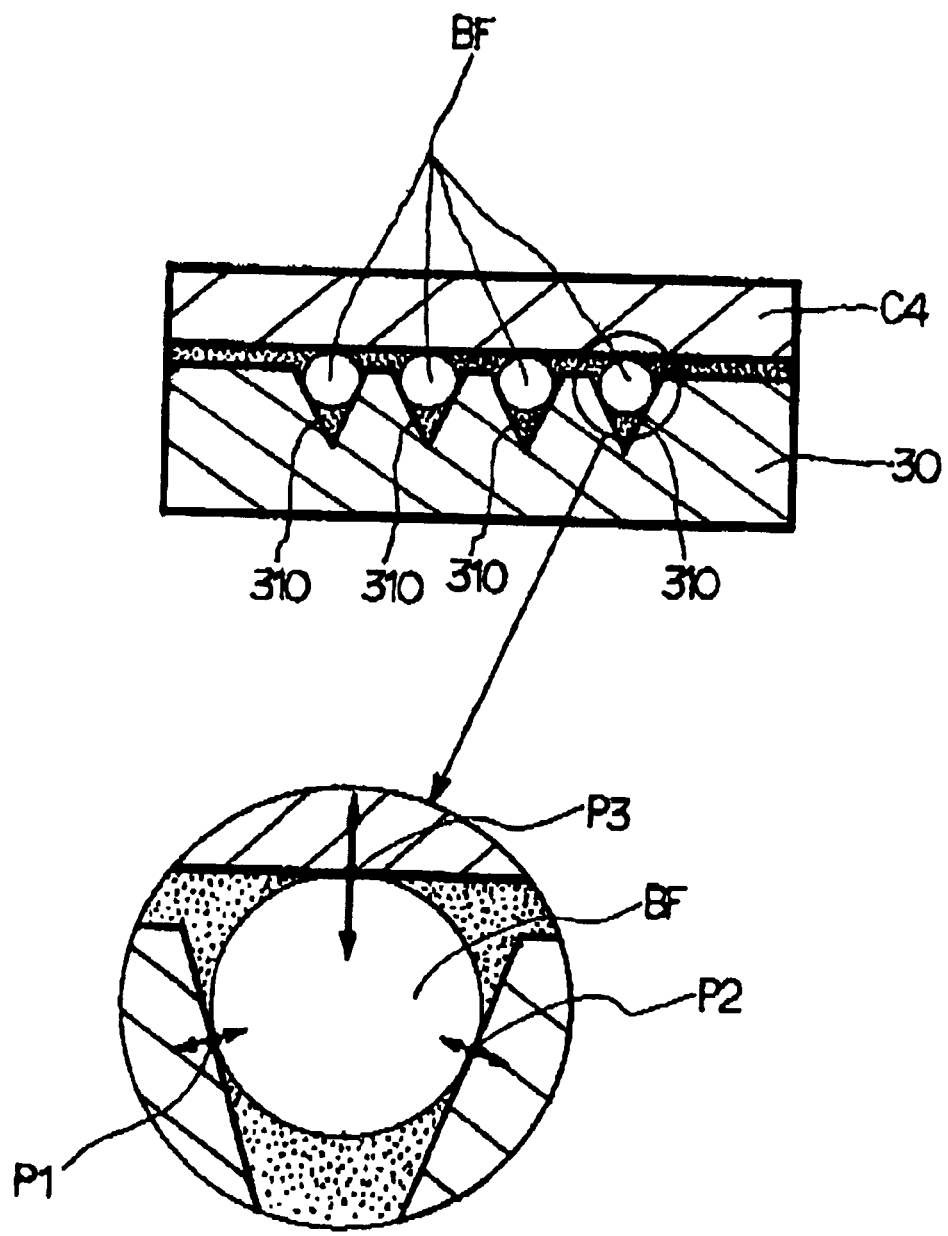
FIG. 3 is a front view showing a cross section of the optical fiber taken along the direction A in FIG. 2.
Figure 4:
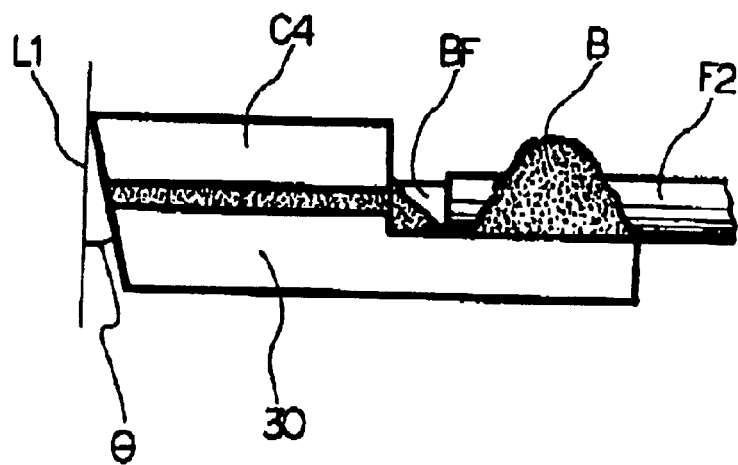
FIG. 4 is a side view of the optical fiber taken along the direction B in FIG. 2.

As shown in FIG. 9, if the fiber alignment is appropriately fixated by using the cover C5 and the optical-fiber block 30, one of the bare fibers BF forms two contact points P1 and P2 with the V-grooves 310, but maintains a little bit of separation with the cover C5. Similar to FIG. 3, in FIG. 9, the arrow indicates the direction of stress, and the length of the arrow indicates the intensity of the stress. When comparing FIG. 3 with FIG. 9, it is found that by applying the cover of the present invention to the fiber-contacting structure, the intensity at the contact point was decreased and the number of the contact points was also decreased, even though the bare-fibers BF formed three contact points with the ridges 504 and 505. The contacting structure using the cover of the present invention noticeably decreased the entire stress distribution compared to the prior art. Namely, the stress distribution existing between the cover and the bare fiber is decreased. Note that the separation between the cover and the bare fiber was merely several micrometers.

Figure 11:
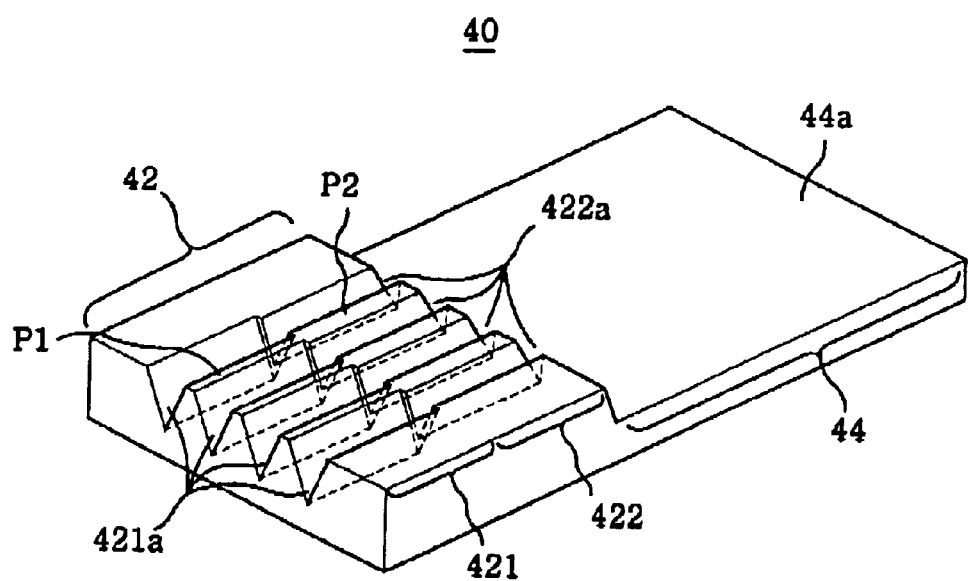
FIG. 11 is the prospective view of a magnified optical-fiber block of an optical-fiber-block assembly according to the third preferred embodiment of the present invention.

FIG. 11 is the prospective view of an optical-fiber block 40 of an optical-fiber-block assembly according to the third embodiment of the present invention. As shown in the drawing, the optical-fiber block 40 is divided into a fiber-alignment area 42 including a first and second fiber-alignment areas 421 and 422, and a stress-relief-depth area 44, which is an extended part from the fiber-alignment area 42. The optical-fiber block 40 shown in FIG. 11 is employed to support the 4-core ribbon fiber. The first and the second fiber-alignment areas 421 and 422, and the stress-relief-depth area 44 are prepared using a photo mask and wet-etching process on a silicon wafer.

The fiber-alignment area 42 includes the first fiber-alignment area 421 mounted with a first V-groove 421a, and the second fiber-alignment area 422 mounted with a second V-groove 422a. More specifically, the fiber-alignment area 42 includes 8 of the first V-grooves 421a and the second V-grooves 422a, which are formed by extending the first V-grooves. Every first V-groove 421a has the same pitch P1, and every second V-groove 422a also has the same pitch P2. The stress-relief-depth area 44 is formed by etching technique known to one of averaged skilled in the art so that the coating part of the ribbon fiber can be disposed thereon. It is so because the bare fibers are aligned along the first and the second V-grooves 421a and 422a, and the coated ribbon fiber is disposed at the stress-relief-depth area 44.

The first V-grooves 421a has a designated width, which is wider than that of the second V-grooves 422a. As such, the external side of the bare fiber touches the second V-grooves due to the higher displacement of the second V-grooves 422a that has a shorter width than the first V-grooves 421a. At this time, the first V-grooves 421a are positioned at the front end.

Figure 12:
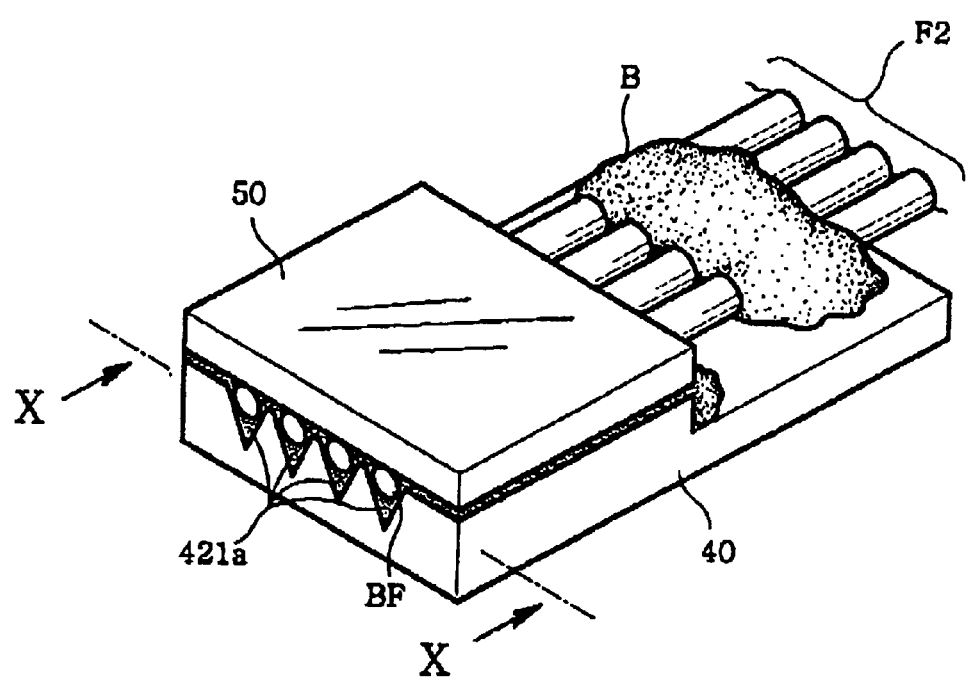
FIG. 12 is a prospective view reflecting the fixed state of a ribbon fiber by using an optical-fiber block of an optical-fiber-block assembly according to the third preferred embodiment of the present invention; and, FIG. 13 is a cross-sectional view of the ribbon fiber taken along the section line X—X in FIG. 12.
Figure 13:
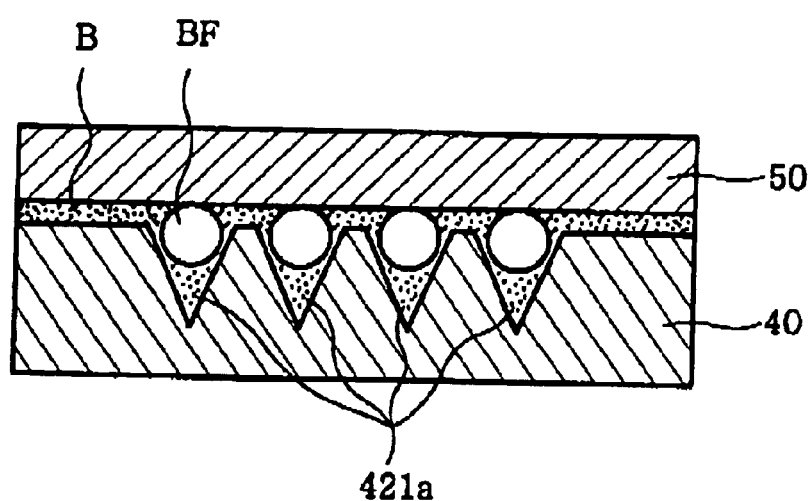

As shown in FIGS. 12 and 13, if epoxy resin is applied to the bare fiber on the first and the second V-grooves 421a and 422a, to which a glass cover 60 is used for fixating the bare fiber, the external side of the bare fiber maintains a certain separation from the first V-grooves 421a, while being in contact with the glass cover 60. On the other hand, the bare fiber is in contact with the second V-grooves 422a as well as with the glass cover 60. In other words, the optical-fiber block 40 mounted with the first V-grooves according to the present invention successfully minimizes the stress concentration by keeping the external side of the bare fiber away from the first V-grooves 421a, thus eliminating the contact points thereon.

While the preferred embodiments of the present invention have been illustrated and described, it will be understood by those skilled in the art that various changes and modifications may be made, and equivalents may be substituted for elements thereof without departing from the true scope of the present invention. For example, in the optical-fiber block of the present invention, the first V-grooves do not have to be disposed at the front end of the fiber-alignment area. Similarly, the second V-grooves do not have to be disposed at the rear end of the fiber-alignment area only. Instead, the first V-grooves can be disposed at the rear end, that is, the stress-relief-depth area, while the second V-grooves can be disposed at the front end. Furthermore, like the first V-grooves, a plurality of V-grooves with a designated length can be aligned along the longitudinal direction thereof, given that the grooves do not contact the bare fiber disposed thereon. Therefore, the foregoing description is intended to embrace all such alternatives and variations falling with the spirit and broad scope of the appended claims.

What is claimed is:

1. An optical-fiber-block assembly for minimizing stress concentration comprising:

an optical-fiber block having at least one V-groove for receiving an optical fiber; and a cover element in a spatial contact with said optical-fiber block for coupling a lightwave pulse to said optical fiber;

said cover element having a top surface and a bottom surface, and at least two ridges located at a predetermined location of the bottom surface of said cover element and disposed longitudinally in a perpendicular direction of said optical fiber that is disposed in said V-grooves, wherein a slot defined by said ridges and said bottom surface of said cover element is filled with an adhesive material for holding said cover element and said optical-fiber block together.

2. The optical-fiber block assembly according to claim 1, wherein said ridge located at the bottom surface of said cover element comes in contact with said optical fiber, thereby forming a contact point.

3. The optical-fiber block assembly according to claim 1, wherein said ridge located at the bottom surface of said cover element maintains a separation from said optical-fiber block.

4. The optical-fiber-block assembly according to claim 1, wherein said slot provides said cover a separation from said optical-fiber block.

5. The optical-fiber-block assembly according to claim 1, wherein said slot provides said cover a separation from said fiber disposed in said V-grooves of said optical-fiber block.

6. The optical-fiber-block assembly according to claim 1, wherein said cover element is made of glass material.

7. The optical-fiber-block assembly according to claim 1, wherein said cover element is made of silicon material.

8. The optical-fiber block assembly according to claim 1, wherein said cover element is made of quartz material.

9. A contacting device for connecting a Planar-Lightwave Circuit (PLC) to an optical fiber, said device comprising:

(a) an optical-fiber block on which at least one optical fiber is aligned along a V-groove of said optical-fiber block; and, (b) a cover element placed over said optical-fiber block using an adhesive material, said cover element having at least two ridges longitudinally extending in a perpendicular direction of said optical fiber, a slot being provided by said ridges.

10. The optical-fiber-block-assembly according to claim 9, wherein said cover element is made of glass material.

11. The optical-fiber-block assembly according to claim 9, wherein said cover element is made of silicon material.

12. The optical-fiber-block assembly according to claim 9, wherein said cover element is made of quartz material.

13. An optical-fiber-block assembly for minimizing stress concentration comprising:

an optical-fiber block having a fiber-alignment area for receiving a plurality of optical fibers and a stress-relief-depth area extending from said fiber-alignment area for relieving stress caused by the coating thickness of said plurality of optical fibers; and said fiber-alignment area comprising:
(a) a first alignment area having a first V-grooves for receiving bare optical fibers in a non-contact arrangement; and,
(b) a second fiber-alignment area having a second V-grooves extending from said first V-grooves for receiving said bare optical fibers,
wherein the width of said first V-grooves is substantially wider than the width of said second V-grooves.

14. The optical-fiber-block assembly according to claim 13, wherein a pitch between said first V-grooves is constant.

15. The optical-fiber-block assembly according to claim 13, wherein a pitch between said second V-grooves is constant.

16. The optical-fiber-block assembly according to claim 13, wherein the pitch between said first V-grooves is smaller than the pitch between said second V-grooves.

17. The optical-fiber-block assembly according to claim 13, further comprising:

a cover element in a spatial contact with said optical-fiber block for coupling a lightwave pulse to said plurality of optical fibers; said cover element having a top surface and a bottom surface, and at least one ridge located at a predetermined location of the bottom surface of said cover element and disposed in a perpendicular direction of said plurality of optical fibers that are disposed in said first and second V-grooves.

18. The optical-fiber-block assembly according to claim 17, wherein said cover element is made of glass material.

19. The optical-fiber-block assembly according to claim 17, wherein said cover element is made of silicon material.

20. The optical-fiber-block assembly according to claim 17, wherein said cover element is made of quartz material.

* * * * *